United States Patent [19]

Schulz

[11] 3,900,576

[45] Aug. 19, 1975

[54] MEAT EMULSION EXTENDER PROCESS

[75] Inventor: Arthur August Schulz, Columbus, Ohio

[73] Assignee: Miles Laboratories, Inc., Elkhart, Ind.

[22] Filed: Sept. 18, 1972

[21] Appl. No.: 290,115

[52] U.S. Cl. ............... 426/311; 426/371; 420/356
[51] Int. Cl. ............................................ A22c 11/00
[58] Field of Search ......... 99/108, 109; 426/42, 56, 426/105, 205, 213, 266, 274, 276, 371, 516, 311, 92, 199, 212, 364

[56] References Cited
UNITED STATES PATENTS

| | | | |
|---|---|---|---|
| 2,682,466 | 6/1954 | Boyer | 426/104 |
| 3,391,007 | 7/1968 | Sair et al. | 99/108 X |
| 3,482,996 | 12/1969 | Christianson et al. | 99/109 |
| 3,503,756 | 3/1970 | Wistreich | 99/109 |
| 3,561,978 | 2/1971 | Geisler et al. | 99/109 |

OTHER PUBLICATIONS

"Webster's New Collegiate Dictionary," 1956, Published by G. & C. Merriam Co., Springfield, Mass., P.C. 330, Article Entitled Frankfurter.

*Primary Examiner*—Hyman Lord
*Attorney, Agent, or Firm*—Louis E. Davidson

[57] ABSTRACT

Meat emulsions, such as those suitable for the production of frankfurters and poultry or fish products, can be extended by the addition of an aqueous mixture of vegetable protein fiber, vegetable protein isolate, albumen, vegetable protein concentrate, edible whey, emulsifier, non-fat dried milk solids, gluten or an aqueous flour slurry, and salt. Appropriate amounts of seasoning, vitamins and minerals can also be present. The resulting extended emulsion mixture when cooked produces a final product which is equal to or superior to the prior art all-meat products.

8 Claims, No Drawings

MEAT EMULSION EXTENDER PROCESS

BACKGROUND AND PRIOR ART

Frankfurters, for example, are usually produced by preparing an emulsion of lean beef, lean pork and pork fat and then cooking the resulting emulsion. While the resulting product is wholesome and nutritious, it often contains an undesirably high amount of fat with a proportionate reduction in overall protein content. It was known in the prior art, as exemplified by U.S. Pat. Nos. 3,482,996 and 3,482,998 and Canadian Pat. No. 867687, that vegetable protein fibers could be added as extenders to meat products to improve their protein content and texture. This technique seems to offer some success when employed with ground meat and dry sausage, but all known attempts to add such vegetable protein fibers to a meat emulsion, such as that used in the production of frankfurters, were unsuccessful in that the resulting overall product was unsatisfactory. There was an undesirable "breaking" of the emulsion or visual separation of the components.

SUMMARY OF THE INVENTION

In accordance with the present invention, a composition is provided which is capable of being added as an extender to a meat emulsion which then produces an acceptable extended emulsion product, such composition comprising from about 39 to about 48.5 percent vegetable protein fiber, from about 5.5 to about 12 percent vegetable protein isolate, from about 2 to about 5 percent albumen, from about 0 to about 6 percent vegetable protein concentrate, from about 4.5 to about 5.5 percent edible whey, from about 0.1 to about 1.5 percent emulsifier, from about 1 to about 5 percent non-fat dried milk solids, from about 9 to about 18 percent gluten or a mixture of flour and water, from about 0 to about 1.5 percent salt, and from about 15.5 to about 19 percent water, said percents being by weight based on the total weight of the composition.

DESCRIPTION OF THE INVENTION

The vegetable protein fibers employed in the composition of the present invention are prepared in a well-known manner by extruding vegetable protein, such as that obtained from soy beans, corn or peanuts, through a spinerette into an acid bath where the extruded material is coagulated into fibers. This is described in U.S. Pat. No. 2,682,466. The resulting fibers can be stretched, washed to desired pH and then cut into desired lengths.

Vegetable protein isolate, such as soy isolate, is a commercially available material containing at least 90 weight percent protein.

Vegetable protein concentrate, such as soy concentrate, is a commercially available material containing about 70 weight percent protein.

The emulsifier useful in the present invention is any food grade surfactant suitable for production of meat emulsions. In particular, a mixture of mono and diglycerides marketed under the tradename of DUREM 287E is preferred.

The other ingredients of the composition are well-known commercially available materials. The composition also preferably contains from about 0.05 to about 1 percent seasoning.

In the production of the extender composition, the various ingredients are mechanically blended at ambient room temperature (about 20°–25°C.). To produce a finished food product, the extender composition is mechanically blended with the meat ingredients and the overall mixture is passed through a meat grinder and then mixed with ice, salt and other seasonings in desired amounts. The resulting mixture is then chopped at a temperature of 54°–58°F. (12°–24°C.) until the desired overall emulsion is formed. This meat emulsion nis then pumped into organoplastic casings of desired size and the stuffed casings are cooked at an internal temperature of about 160°–170°F. (71°–71°C.) for about 1.5–2 hours. The cooked material is then showered with hot water and then by cold water and placed in a refrigerated storage room. The casings are then peeled off and the product packaged. All of the above steps, with the exception of adding the extender composition, are well-known and are generally practiced in the production of frankfurters.

The invention will be described in further detail in the following examples.

EXAMPLE 1

A mixture of 20 lb. of spun soy protein fiber having pH 5.0 and strands each about 3 in. long, 5 lb. soy isolate, 2 lb. albumen, 2 lb. edible whey, 0.03 lb. weiner seasoning, 0.5 lb. salt, 0.002 lb. of a vitamin-mineral blend, 2 lb. non-fat dry milk solids, 4 lb. gluten, 0.1 lb. emulsifier (DUREM 287E) and 7 lb. water was blended to form an emulsion composition containing 46.9 percent vegetable protein fiber, 11.7 percent vegetable protein isolate, 4.7 percent albumen, 4.7 percent edible whey, 0.07 percent weiner seasoning, 1.2 percent salt, 0.005 percent vitamin-mineral blend, 4.7 percent non-fat dry milk solids, 9.4 percent gluten, 0.23 percent emulsifier and 16.4 percent water, said percents being by weight based on the total weight of the composition. A 30 lb. portion of this emulsion was then blended with a mixture of 14 lb. lean beef, 24 lb. lean pork, and 32 lb. pork fat to produce an overall mixture containing 30 weight percent extender and 70 weight percent meat. To this mixture were added 17 lb. ice and 8 lb. of spices, and the resulting overall mixture was chopped, stuffed into casings and cooked according to well-known procedures. The casings peeled away from the cooked product in an excellent manner. The resulting frankfurter had excellent viscosity, texture and binding with no fat caps, grease-out or water seepage. It was equal to an all-meat frankfurter in these characteristics but was superior in that it contained less fat and more protein than the prior art all-meat frankfurter. When these extended products were subsequently boiled and grilled, they were satisfactory and equal in acceptance to all-meat products.

EXAMPLE 2

A mixture of 7250 g. of spun soy protein fiber described in Example 1, 1600 g. soy isolate, 715 g. albumen, 725 g. edible whey, 14 g. weiner seasoning, 18 g. emulsifier (DUREM 287E), 0.85 g. of a vitamin-mineral blend, 2390 g. water, 150 g. salt, 645 g. non-fat dried milk solids, and 1450 g. gluten was blended to form an emulsion containing 48.5 percent soy fiber, 10.7 percent soy isolate, 4.8 percent albumen, 4.8 percent edible whey, 0.1 percent weiner seasoning, 0.1 percent emulsifier, 0.006 percent vitamin-mineral blend, 16 percent water, 1 percent salt, 4.3 percent non-fat dry milk solids, and 9.7 percent gluten, said percents being by weight based on the total weight of the composition. A 30 weight parts portion of this emulsion was then blended with 14 weight parts lean beef, 24 weight parts lean pork and 32 weight parts pork fat to produce an overall mixture containing 30 weight percent extender and 70 weight percent meat. To this mixture were added 17 weight parts ice, 5 weight parts water and 8 weight parts spices, and the resulting overall mixture was treated as described in Example 1. The resulting cooked product was at least as good as a prior art all-meat frankfurter. Subsequent boiled and grilled extended products were satisfactory.

EXAMPLE 3

A mixture of 7250 g. of spun soy protein fiber described in Example 1, 880 g. soy isolate, 715 g. albumen, 725 g. edible whey, 14 g. weiner seasoning, 18 g. emulsifier (DUREM 287E), 0.85 g. of a vitamin-mineral blend, 2390 g. water, 150 g. salt, 645 g. non-fat dried milk solids, 1450 g. gluten and 880 g. soy concentrate was blended to form an emulsion containing 47.9 percent soy fiber, 5.8 percent soy isolate, 4.7 percent albumen, 4.8 percent edible whey, 0.1 percent weiner seasoning, 0.1 percent emulsifier, 0.006 percent vitamin-mineral blend, 15.8 percent water, 1 percent salt, 4.3 percent non-fat dried milk solids, 9.6 percent gluten and 5.8 percent soy concentrate, said percents being by weight based on the total weight of the composition. A 30 weight parts portion of this emulsion was then blended with 14 weight parts lean beef, 24 weight parts lean pork and 32 weight parts pork fat to produce an overall mixture containing 30 weight percent extender and 70 weight percent meat. To this mixture were added 17 weight parts ice, 11 weight parts water and 8 weight parts spices, and the resulting overall mixture was treated as described in Example 1. The resulting cooked product was at least as good as a prior art all-meat frankfurter. Subsequent boiled and grilled extended products were satisfactory.

EXAMPLE 4

A mixture of 6000 g. of spun soy protein fiber described in Example 1, 1560 g. soy isolate, 360 g. albumen, 725 g. edible whey, 14 g. weiner seasoning, 18 g. emulsifier (DUREM 287E), 0.85 g. of a vitamin-mineral blend, 2600 g. water, 150 g. salt, 645 g. non-fat dried milk solids, 1450 g. gluten and 360 g. soy concentrate was blended to form an emulsion containing 43.3 percent soy fiber, 11.2 percent soy isolate, 2.6 percent albumen, 5.2 percent edible whey, 0.1 percent weiner seasoning, 0.1 percent emulsifier, 0.006 percent vitamin-mineral blend, 18.8 percent water, 1.1 percent salt, 4.6 percent non-fat dried milk solids, 10.4 percent gluten and 2.6 percent soy concentrate, said percents being by weight based on the total weight of the composition. A 30 weight parts portion of this emulsion was then blended with 14 weight parts lean beef, 24 weight parts lean pork and 32 weight parts pork fat to produce an overall mixture containing 30 weight percent extender and 70 weight percent meat. To this mixture were added 17 weight parts ice, 6 weight parts water and 8 weight parts spices, and the resulting overall mixture was treated as described in Example 1. The resulting cooked product was at least as good as a prior art all-meat frankfurter. Subsequent boiled and grilled extended products were satisfactory. The extender composition of this example represents the presently preferred extender for use in frankfurters at a 30 weight percent extender level.

EXAMPLE 5

A mixture of 40 lb. spun soy protein fiber described in Example 1, 10.5 lb. soy isolate, 2.4 lb. albumen, 3.4 lb. soy concentrate, 4.8 lb. edible whey, 1 lb. weiner seasoning, 1.2 lb. emulsifier (DUREM 287E), 0.006 lb. of a vitamin-mineral blend, 17.1 lb. water, 1 lb. non-fat dried milk solids and 17.4 lb. gluten was blended to form an emulsion containing 40.5 percent soy fiber, 10.6 percent soy isolate, 2.4 percent albumen, 3.4 percent soy concentrate, 4.9 percent edible whey, 1 percent weiner seasoning, 1.2 percent emulsifier, 0.006 percent vitamin-mineral blend, 17.3 percent water, 1 percent non-fat dried milk solids and 17.6 percent gluten, said percents being by weight based on the total weight of the compositon. A 43 lb. portion of this emulsion was then blended with 20 lb. lean beef, 40 lb. lean pork and 40 lb. pork fat to produce an overall mixture containing 30 weight percent extender and 70 weight percent meat. To this mixture were added 33 lb. ice and 9.5 lb. spices, and the resulting overall mixture was treated as described in Example 1. The resulting cooked product was at least as good as a prior art all-meat frankfurter. Subsequent boiled and grilled extended products were satisfactory.

EXAMPLE 6

A mixture of 120 lb. of spun soy protein fiber described in Example 1, 33 lb. soy isolate, 8 lb. albumen, 8 lb. soy concentrate, 14 lb. edible whey, 3 lb. weiner seasoning, 3 lb. emulsifier (DUREM 287E), 0.018 lb. of a vitamin-mineral blend, 51 lb. water, 3 lb. salt, 12 lb. non-fat dried milk solids and 52 lb. gluten was blended to form an emulsion containing 39.1 percent soy fiber, 10.7 percent soy isolate, 2.6 percent albumen, 2.6 percent soy concentrate, 4.6 percent edible whey, 1 percent weiner seasoning, 1 percent emulsifier, 0.006 percent vitamin-mineral blend, 16.6 percent water, 1 percent salt, 3.9 percent non-fat dried milk solids and 17 percent gluten, said percents being by weight based on the total weight of the composition. Portions of this extender emulsion were mixed with various amounts of lean beef, lean pork and pork fat and the resulting mixtures were further blended with water, ice, and seasonings, and the overall mixtures were treated as described in Example 1 to form cooked frankfurters. The various proportions are shown in the following table wherein all amounts are in weight parts.

| Components | Control | Percent Extender | | | |
| --- | --- | --- | --- | --- | --- |
| | | 30 | 40 | 50 | 70 |
| Lean beef | 20 | 14 | 12 | 10 | 6 |
| Lean pork | 40 | 28 | 24 | 20 | — |
| Pork fat | 40 | 28 | 24 | 20 | 24 |
| Extender | — | 30 | 40 | 50 | 70 |
| Water | 25 | 30 | 25 | 25 | 25 |
| Ice | 5 | — | — | — | — |
| Seasonings | 8 | 8 | 8 | 8 | 8 |

The resulting extended products all were at least as good as the all-meat control. Subsequent boiled and grilled products were all satisfactory.

The above examples all employed gluten in the extender composition. This can be replaced with an aqueous wheat flour slurry as described in the following example.

EXAMPLE 7

An emulsion was prepared containing 40 percent soy fiber, 10.4 percent soy isolate, 2.4 percent albumen, 2.4 percent soy concentrate, 4.8 percent whey, 0.1 percent weiner seasoning, 0.1 percent emulsifier, 17.1 percent water, 1.1 percent salt, 4.3 percent non-fat dried milk solids, 0.006 percent of a vitamin-mineral blend, and a slurry of 5.2 percent flour and 12.3 percent water, said percents being by weight based on the total weight of the composition. This is the presently preferred non-gluten meat emulsion extender. Portions of this emulsion were mixed with lean beef, lean pork and pork fat to form a mixture containing 30 weight percent extender and 70 weight percent meat. To this were then added water, ice, and seasonings, and the overall mixture was treated as described in Example 1. The resulting extended frankfurter composition is equally acceptable when compared against a prior art all-meat product.

The above examples all related to emulsion extenders containing weiner seasonings intended for use in producing extended frankfurters. The emulsion extender was also shown to be suitable for use with mixtures of lean beef, lean pork and pork fat. This extender composition can further be used with all-pork mixtures and with mixtures containing poultry or fish. The emulsion extender of the present invention is suitable for extending poultry emulsions as is described in the following example.

EXAMPLE 8

A mixture of 13.3 lb. of spun soy protein fiber described in Example 1, 3.5 lb. soy isolate, 0.8 lb. albumen, 0.8 lb. soy concentrate, 1.6 lb. edible whey, 0.4 lb. emulsifier (DUREM 287E), 0.002 lb. of a vitamin-mineral blend, 5.7 lb. water, 0.33 lb. salt, 1.4 lb. non-fat dried milk solids, and 5.8 lb. gluten was blended to form an emulsion containing 39.5 percent soy fiber, 10.4 percent soy isolate, 2.4 percent albumen, 2.4 percent soy concentrate, 4.8 percent edible whey, 1.2 percent emulsifier, 0.006 percent vitamin-mineral blend, 17 percent water, 1 percent salt, 4.2 percent non-fat dried milk solids and 17.2 percent gluten. A 1.8 lb. portion of this extender emulsion was mixed with 1.8 lb. turkey trimmings and 1.8 lb. finely ground turkey to form a mixture containing 33 weight percent extender and 67 percent poultry meat. To this were added 1.5 lb. salt and 0.75 lb. water and the overall mixture was chopped, blended and cooked in a manner similar to that described in Example 1. The resulting extended poultry product was equally acceptable when compared to an all-poultry meat product.

It can be seen from the above examples that each of the extender emulsion ingredients can be used over a certain composition range and still produce acceptable products. It has been found that when the ingredient amounts extend outside these particular ranges the resulting inclusion of the extender emulsion in extended meats produces unacceptable products. There is excessive fat capping and moisture weeping. The products are soft, meshy and poorly flavored. The emulsion extender composition of the present invention thus represents an advance in the food art.

While the products of the above examples all contained minor amounts of vitamins and minerals to improve the overall nutrition, the novel extender compositions need not always contain such additives in order to properly act as an extender. Likewise, the extender need not always contain flavorings, such as weiner seasoning.

What is claimed is:

1. A process for the production of an acceptable extended meat emulsion product which comprises adding to a mixture of meat emulsion ingredients an extender composition comprising from about 39 to about 48.5 percent vegetable protein fiber, from about 5.5 to about 12 percent vegetable protein isolate, from about 2 to about 5 percent albumen, from about 0 to about 6 percent vegetable protein concentrate, from about 4.5 to about 5.5 percent edible whey, from about 0.1 to about 1.5 percent emulsifier, from about 1 to about 5 percent non-fat dried milk solids, from about 9 to about 18 percent gluten or a mixture of flour and water, from about 0 to about 1.5 percent salt, and from about 15.5 to about 19 percent water, said percents being by weight based on the total weight of the extender composition, blending the meat emulsion ingredients and the extender composition to form an extended meat emulsion, and then heating the extended meat emulsion to form the finished product.

2. A process according to claim 1 wherein the extender composition also contains from about 0.05 to about 1 percent seasoning.

3. A process according to claim 1 wherein the extender composition also contains minor amounts of vitamins and minerals.

4. A process according to claim 1 especially useful for the production of frankfurters wherein the extender composition comprises about 43.3 percent vegetable protein fiber, about 11.2 percent vegetable protein isolate, about 2.6 percent albumen, about 2.6 percent vegetable protein concentrate, about 5.2 percent edible whey, about 0.1 percent frankfurter seasoning, about 0.1 percent emulsifier, about 4.6 percent non-fat dried milk solids, about 10.4 percent gluten, about 1.1 percent salt, and about 18.8 percent water, said percents being by weight based on the total weight of the extender composition.

5. A process according to claim 1 especially useful for the production of poultry products wherein the extender composition comprises about 39.5 percent vegetable protein fiber, about 10.4 percent vegetable protein isolate, about 2.4 percent albumen, about 2.4 percent vegetable protein concentrate, about 4.8 percent edible whey, about 1.2 percent emulsifier, about 4.2 percent non-fat dried milk solids, about 17.2 percent gluten, about 1 percent salt and about 17 percent water, said percents being by weight based on the total weight of the extender composition.

6. A process according to claim 1 especially useful for the production of frankfurters wherein the extender composition comprises about 40 percent vegetable protein fiber, about 10.4 percent vegetable protein isolate, about 2.4 percent albumen, about 2.4 percent vegetable protein concentrate, about 4.8 percent edible whey, about 0.1 percent frankfurter seasoning, about 0.1 percent emulsifier, about 4.3 percent non-fat dried milk solids, a slurry mixture of about 5.2 percent flour and about 12.3 percent water, about 1.1 percent salt and about 17.1 percent water, said percents being by weight based on the total weight of the extender composition.

7. A process according to claim 1 wherein the extender composition is employed in an amount from about 30 to about 70 weight percent of the total mixture weight of extender and meat ingredients in the meat emulsion.

8. A process according to claim 4 for the production of frankfurters wherein the extender composition is employed in an amount of 30 weight percent and a mixture of lean beef, lean pork and pork fat is employed in an amount of 70 weight percent, said percents being based on the total weight of extender, lean beef, lean pork and pork fat in the meat emulsion.

* * * * *